US008451338B2

(12) United States Patent
Levin et al.

(10) Patent No.: US 8,451,338 B2
(45) Date of Patent: May 28, 2013

(54) METHOD AND APPARATUS FOR MOTION INVARIANT IMAGING

(75) Inventors: Anat Levin, Brookline, MA (US); Peter Sand, Brooklyn, NY (US); Taeg Sang Cho, Cambridge, MA (US); Fredo Durand, Boston, MA (US); William T. Freeman, Acton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1005 days.

(21) Appl. No.: 12/058,105

(22) Filed: Mar. 28, 2008

(65) Prior Publication Data

US 2009/0244300 A1    Oct. 1, 2009

(51) Int. Cl.
*H04N 5/228*    (2006.01)

(52) U.S. Cl.
USPC .................. 348/208.4; 348/208.3; 382/255; 382/279

(58) Field of Classification Search
USPC ............... 348/208.4, 222.1, 208.3; 382/255, 382/279
See application file for complete search history.

(56) References Cited

U.S. PATENT DOCUMENTS

| | | | | |
|---|---|---|---|---|
| 5,237,365 | A * | 8/1993 | Miyazawa | 396/49 |
| 6,377,404 | B1 * | 4/2002 | Goosey, Jr. | 359/682 |
| 6,687,386 | B1 * | 2/2004 | Ito et al. | 382/103 |
| 2005/0047672 | A1 * | 3/2005 | Ben-Ezra et al. | 382/255 |
| 2008/0266655 | A1 * | 10/2008 | Levoy et al. | 359/368 |

OTHER PUBLICATIONS

Mitsubishi Electric Research Laboratories, "Image Deblurring with Coded Exposure (Flutter Shutter Camera)," http://www.merl.com/projects/deblur/ retrieved from the World Wide Web on Mar. 11, 2008, 1 page.

CAVE, "Motion Deblurring Using Hybrid Imaging," http://wwwl.cs.columbia.cdu/CAVE/projects/motion_dcblur/motion_dcblur.php retrived from the World Wide Web on Mar. 11, 2008, pp. 1-4.

CDM Optics, "Wavefront Coding Overview," http://www.cdm-optics.com/?section=Tutorials retrived from the World Wide Web on Mar. 11, 2008, pp. 1-2.

Cathey, W.T., and Dowski, E.R., "New Paradigm for Imaging Systems," *Applied Optics*, 41(29):6080-6092, (2002).

* cited by examiner

*Primary Examiner* — Usman Khan
(74) *Attorney, Agent, or Firm* — Hamilton, Brook, Smith & Reynolds, P.C.

(57) ABSTRACT

Object motion during camera exposure often leads to noticeable blurring artifacts. Proper elimination of this blur is challenging because the blur kernel is unknown, varies over the image as a function of object velocity, and destroys high frequencies. In the case of motions along a 1D direction (e.g. horizontal), applicants show that these challenges can be addressed using a camera that moves during the exposure. Through the analysis of motion blur as space-time integration, applicants show that a parabolic integration (corresponding to constant sensor acceleration) leads to motion blur that is not only invariant to object velocity, but preserves image frequency content nearly optimally. That is, static objects are degraded relative to their image from a static camera, but all moving objects within a given range of motions reconstruct well. A single deconvolution kernel can be used to remove blur and create sharp images of scenes with objects moving at different speeds, without requiring any segmentation and without knowledge of the object speeds.

20 Claims, 10 Drawing Sheets

(a) TIME 1

(b) TIME 2

(c) STATIC CAMERA (d) PARABOLIC CAMERA

METHOD AND APPARATUS FOR MOTION INVARIANT IMAGING

GOVERNMENT SUPPORT

The invention was supported, in whole or in part, by the following grants:
HM 1582-05-C-0011 from the National Geospatial Intelligence Agency,
IIS-0413232 from the National Science Foundation, and CAREER 0447561 from the National Science Foundation. The government has certain rights in the invention.

BACKGROUND OF THE INVENTION

Motion blur often limits the quality of photographs and can be caused by either the shaking of the camera or the movement of photographed objects (e.g., subject, passerby, props, etc.) in the scene. Modern cameras address the former case with image stabilization, where motion sensors control mechanical actuators that shift the sensor or camera lens element in real time during the exposure to compensate for the motion (shaking) of the camera, e.g. Canon. 2003. *EF Lens Work III, The Eyes of EOS*. Canon Inc. Lens Product Group. The use of image stabilization enables sharp handheld photographs of still subjects at much longer shutter speed, thereby reducing image noise. Unfortunately, image stabilization only addresses camera motion and cannot help with moving objects in the subject scene or field of view.

One option is to remove the blur after the shot was taken using deconvolution. However, this raises several challenges. First, the typical motion-blur kernel is a line segment in the direction of motion, which corresponds to a box filter. This kernel severely attenuates high spatial frequencies and deconvolution quickly becomes ill-conditioned. Second, the length and direction of the blur kernel both depend on the motion and are therefore unknown and must be estimated. Finally, motion blur usually varies over the image since different objects or regions can have different motion, and segmentation must be used to separate image regions with different motion. These two later challenges lead most existing motion deblurring strategies to rely on multiple input images (see Bascle, B., Blake, A., and Zisserman, A., "Motion de-blurring and super-resolution from an image sequence," *ECCV,* 1996; Rav-Acha and Peleg, S., "Two motion-blurred images are better than one," *Pattern Recognition Letters,* 2005; Zheng, M. S. J., "A slit scanning depth of route panorama from stationary blur," *Proc. IEEE Conf. Comput. Vision Pattern Recog.,* 2005; Bar, L., Berkels, B., Sapiro, G., and Rumpf, M., "A variational framework for simultaneous motion estimation and restoration of motion-blurred video," *ICCV,* 2007; Ben-Ezra, M., and Nayar, S. K., "Motion-based motion deblurring," *PAMI,* 2004; Yuan, L., Sun, J., Quan, L., and Shum, H., "Image deblurring with blurred/noisy image pairs," *SIGGRAPH,* 2007.)

More recent methods attempt to remove blur from a single input image using natural image statistics (see Fergus, R., Singh, B., Hertzmann, A., Roweis, S., and Freeman, W., "Removing camera shake from a single photograph," *SIGGRAPH,* 2006; Levin, A., "Blind motion deblurring using image statistics," *Advances in Neural Information Processing Systems (NIPS),* 2006). While these techniques demonstrated impressive abilities, their performance is still far from perfect. Raskar et al. proposed a hardware approach that addresses the first challenge (Raskar, R., Agrawal, A., and Tubmlin, J., "Coded exposure photography: Motion deblurring using fluttered shutter," *ACM Transactions on Graphics, SIGGRAPH* 2006 *Conference Proceedings,* Boston, Mass. vol. 25, pgs. 795-804). A fluttered shutter modifies the line segment kernel to achieve a more broad-band frequency response, which allows for dramatically improved deconvolution results. While the Raskar approach blocks half of the light, the improved kernel is well worth the tradeoff. However, this approach still requires the precise knowledge of motion segmentation boundaries and object velocities, an unsolved problem.

SUMMARY OF THE INVENTION

The present invention addresses the foregoing problems in the art. In the present invention, applicants show that if the motion is restricted to a 1D set of velocities, such as horizontal motion (as is the case with many real world objects like cars or walking people), one can address all three challenges of the prior art mentioned above. Using camera hardware similar to that used for image stabilization, applicants and the present invention make the point-spread function (PSF) invariant to motion and easy to invert. For this, applicants/the invention system introduce a specific camera movement during exposure. This movement is designed so that the compound motion of the camera and any object velocity (within a speed range and along the selected orientation) and at any depth in the camera field of view results in the same easy-to-invert PSF. Since the entire scene is blurred with an identical PSF (up to tail truncation), including static objects and moving objects, the blur can be removed via deconvolution, without segmenting moving objects and without estimating their velocity. In practice, applicants find that motions even somewhat away from the selected 1D orientation are deblurred as well.

In a preferred embodiment, a method and apparatus deblurs images of a moving object. During imaging of the moving object, the invention system blurs an entire scene of the moving object. This blurring is in a manner which is invariant to velocity of the moving object. Next the invention system deconvolutes the blurred entire scene and generates a reconstructed image. The reconstructed image displays the moving object in a deblurred state.

The invention step of blurring the entire scene is preferably implemented by moving any one or combination of the camera, a lens element of the camera and camera sensor. This moving of the camera or part of the camera system includes linear movement in a range of direction and speed sufficient to include direction and speed of the moving object. Examples of linear movement here are a sinusoidal pattern, a parabolic pattern or any other simple harmonic motion and the like.

In one embodiments, the linear movement follows a parabolic path by moving laterally initially at a maximum speed of the range and slowing to a stop and then moving in an opposite direction laterally, increasing in speed to a maximum speed of the range in the opposite direction and stopping.

The present invention may be applied to a variety of moving objects and environments. For non-limiting examples, the moving object may be (a) a moving vehicle on a roadway or other terrain, (b) a body part of a patient (human or animal), (c) in aerial photography, or other moving objects in a subject scene.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1A:
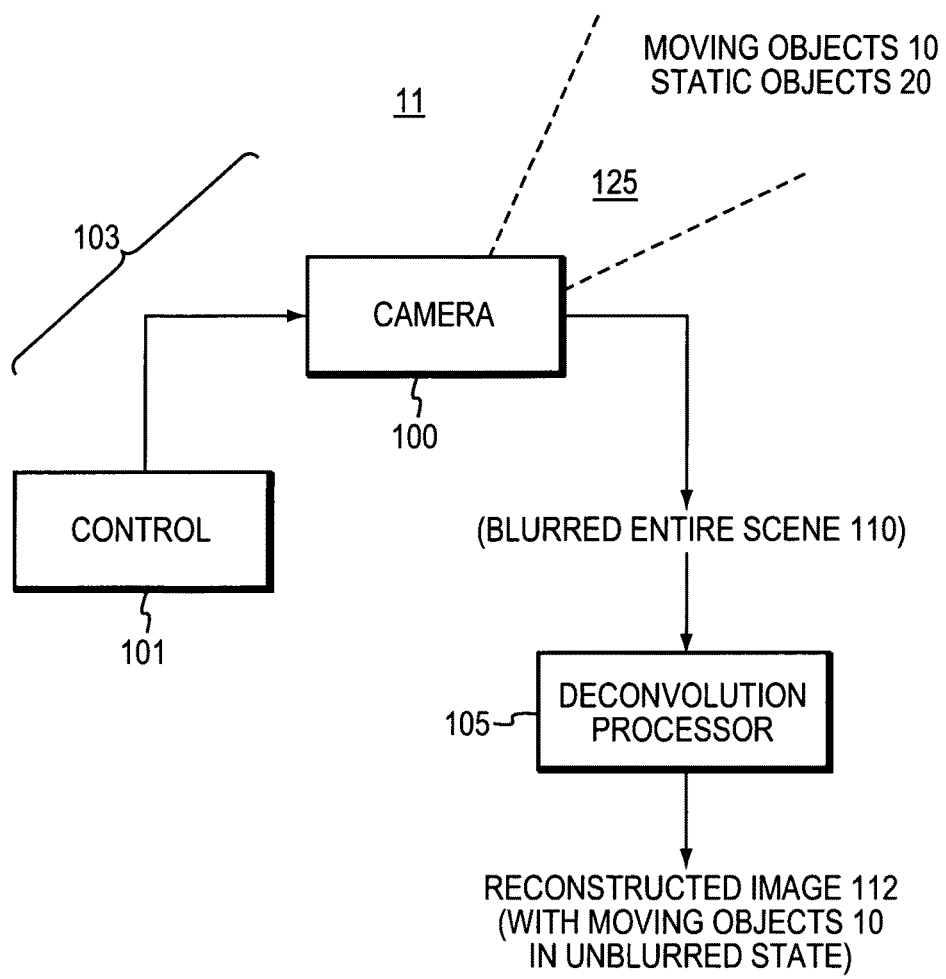
FIG. 1a is a block diagram of an embodiment of the present invention.

A description of example embodiments of the invention follows.

Applicants' approach is inspired by wavefront coding (Cathey, W., and Dowski, R., "A new paradigm for imaging systems," *Applied Optics*, No. 41, pgs. 1859-1866, (1995)), where depth of field is improved by modifying a lens to make the defocus blur invariant to depth and easy to invert. While the cited work deals with wave optics and depth of field, applicants and the present invention consider geometric ray optics and remove 1D motion blur.

By analyzing motion blur as integration in a space time volume over curves resulting from camera and object motion, applicants prove that one integration curve that results in a motion-invariant PSF (point-spread function) is a parabola. This corresponds to constant 1D acceleration of the camera, first going fast in one direction, progressively slowing down to a stop and then picking up speed in the other (opposite) direction. As a result for any object velocity within a range, there is always one moment during exposure where the camera is perfectly tracking (in speed and direction) the object. While the camera motion is along a straight or lateral line, applicants call it "parabolic motion" because of the parabolic relationship between position and time.

In addition to its invariance to object speed, the present invention PSF preserves more high frequencies for moving objects than a normal exposure. This however comes at the cost of slightly degraded performance for static objects. In fact, applicants show that even if object motions could be estimated perfectly, the type of PSFs resulting from the parabolic camera motion is near-optimal for a stable deconvolution over a range of possible object speeds. This optimality is in the sense of minimizing the degradation of the reconstructed image for a range of potential object velocities. In a nutshell, applicants show that there is a fixed bandwidth budget for imaging objects at different velocities. For example, a static camera spends most of this budget to achieve high-quality images of static objects, at the cost of severe blur for moving objects. Applicants' (the present invention's) design distributes this budget more uniformly, improving the reconstruction of all motion velocities, at the price of a slightly worse reconstruction of the static parts.

There are three basic options for implementing this camera movement: a translation of the full camera, a rotation of the camera, or a translation of the sensor or lens element. For a commercial product, the latter may be the best solution, and could be achieved with the existing hardware used for stabilization. However, if the focal length is not too wide-angle, a camera rotation is a good approximation to sensor translation and is easier to implement as a prototype. Applicants demonstrate a prototype using camera rotation and show 1D speed-invariant deconvolution results for a range of 1D and even for some 2D motions.

Motion Invariant Integration

In order to derive a motion-invariant photography scheme, the present invention characterizes motion blur as an integration in space-time. Applicants show that the effect of object motion can be characterized by a shear. Applicants also show that a camera parabolic movement is invariant to shear in space-time and permits the removal of motion blur.

Space-time analysis of motion blur: The set of 2D images falling on a detector over time forms a 3D space-time volume of image intensities. Consider a 2D xt-slice through that 3D space-time volume. Each row in this slice represents a horizontal 1D image, as captured by a static pinhole camera with an infinitesimal exposure time.

For sufficiently small exposure, a first order approximation to the object motion is sufficient, and the motion path is assumed to be linear. In this case, scene points trace straight lines in the xt-slice and the slopes of these lines are a function of the object velocity and depth. FIGS. 2a-2d demonstrate an xt-slice—the green (central area) object 15 is static, which means that it is invariant to time and results in vertical lines in space time. The blue (right hand side) and red (left hand side) objects 17, 19 are moving in opposite directions, resulting in oblique lines. The slope of these lines correspond to image-space object velocity.

Formally, the space-time function of an object moving at constant velocity s is related to that of a static object by a shear, since kinematics gives:

$$x(t)=x(0)+st \tag{1}$$

Figure 2:
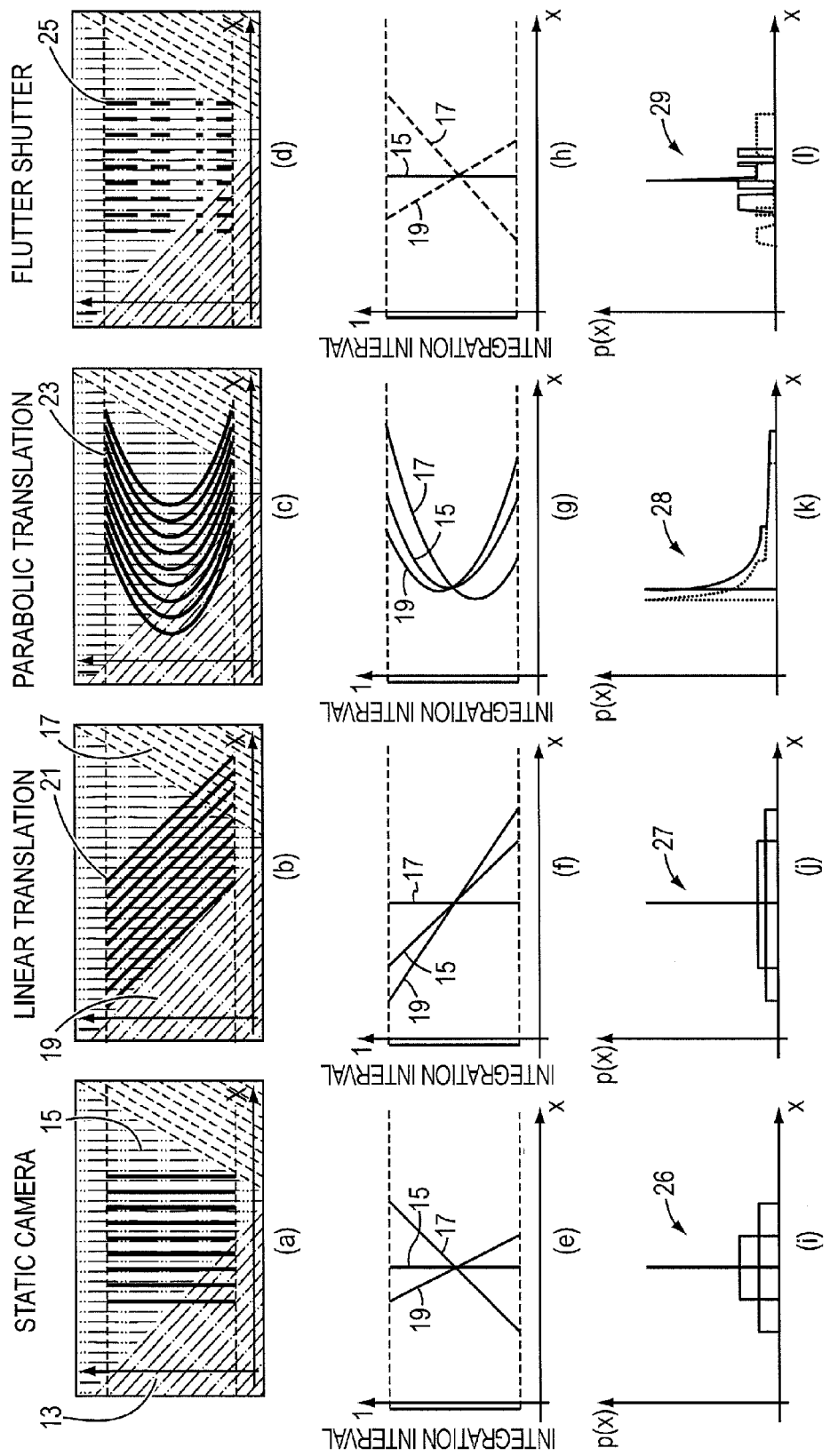
FIGS. 2a-2d are schematic graphs illustrating xt-slice and integration curves resulting from different camera motions.
FIGS. 2e-2h are graphs illustrating corresponding integration curves sheared to account for object slope for FIGS. 2a-2d.
FIGS. 2i-2l are graphs of projected point spread functions corresponding to different object velocities of FIGS. 2a-2d.

Camera motion and integration: If the sensor is translating, the image recorded at time instance t is a shifted version of row t in the xt-plane (the xt-plane represents the scene relative to a static camera). Thus, when the scene is captured by a translating sensor over a finite exposure time, the recorded intensities (the blurred image) are the average of all shifted images seen during the exposure length, at all infitisimal time instances. That is, the sensor elements integrate light over curves in the xt-plane. The simplest case is a static camera, which integrate light over straight vertical lines 13 (FIG. 2a). A sensor translating with constant velocity leads to slant straight integration lines 21 (in FIG. 2b the camera tracks the red object 19 motion). The integration curve of a uniformly-translating sensor is a sheared version of that of the static sensor, following the same principle as the object-motion shear (but in the opposite direction). More complex sensor motion leads to more general curves. For example FIG. 2c presents a parabola 23, obtained with translating sensor undergoing a parabolic displacement. If a shutter is fluttered during exposure as in Raskar et al. 2006 (cited above), the integration curve 25 is discontinuous as shown in FIG. 2d.

Since the applicants only translate the sensor, the integration curves that applicants consider are spatially shift invariant. Applicants denote by L(x,t) the intensity of light rays in the xt-slice, I(x) the intensity of the captured image, f(t) the integration curve, and [−T,T] an integration interval of length 2T. The captured image can be modeled as:

$$I(x) = \int_{-T}^{T} L(f(t) + x, t) dt \qquad (2)$$

The Point Spread Function: Denote by $I^0(x)$ an ideal instantaneous pinhole image $I^0(x)=L(x, 0)$. The movement of the camera creates motion blur. For a static object, applicants can model it as a convolution of $I^0$ with a Point Spread Function (PSF) $\phi_0: I = \phi_0 \otimes I^0$. In this case, $\phi_0$ is simply the projection off along the time direction onto the spatial line:

$$\phi_0(x) = \int_t \delta_{f(t) = x} dt \qquad (3)$$

where δ is a Dirac.

Now consider objects moving at speed s and seek to derive an equivalent Point Spread Function $\phi_s$. We can reduce this to the static case by applying a change of frame that "stabilizes" this motion, that is, that makes the space-time volume of this object vertical. We apply the inverse of the shear in Eq. 1, which is the shear in the opposite direction, and the sheared curve can be expressed as:

$$fs(t)=f(t)-st \qquad (4)$$

Sheared curves are illustrated in FIGS. 2e-2h. As a result, the PSF $\phi_s$ for a moving object is the vertical projection of the sheared integration curve $f_s$. Equivalently, it is the oblique projection of f along the direction of motion.

FIGS. 2i-2l present the PSF 26, 27, 28, 29 of the three different objects 15, 17, 19, for each of the curves 13, 21, 23, 25, in FIGS. 2a-2d. For example, if the integration curve is a straight line 13, 21 the PSF 26, 27 is a delta function for objects whose slope matches the integration slope, and a box filter for other slopes. The box width is a function of the deviation between the object slope and integration slope.

The analytic way to derive this projection is to note that the vertical projection is the "amount of time" the curve f spent at the spatial point x—the slope of the inverse curve. That is, if $g_s=f_s^{-1}$ is the inverse curve, the PSF (the vertical projection) satisfies: $\phi_s(x)=g_s'(x)$.

Shear invariant curves: Applicants and the present invention derive a camera motion rule that leads to a velocity invariant PSF. One can achieve such effect if one devotes a portion of the exposure time tracing each possible velocity, and one spends an equal amount of time tracing each velocity, so that all velocities are covered equally. The derivative of an integration curve representing such motion should be linear and therefore, a candidate curve is a parabola.

Applicants have shown that PSFs corresponding to different velocities are obtained from sheared version of the sensor integration curve. Consider a parabola curve 23 of the form: $f(t)=a_0 t^2$ (FIG. 2c). The resulting PSF 28 behaves like $1/\sqrt{a_0 x}$ (FIG. 2k). Applicants note that a sheared parabola is also a parabola with the same scale, only the center is shifting $$f_x(t) = f(t) - st = a_0\left(t - \frac{s}{2a_0}\right)^2 - \frac{s^2}{4a_0} \qquad (5)$$

Thus, the projections $\phi_s$ are also identical up to a spatial shift. The important practical application of this property is that if the camera is moved during integration along a parabola curve, one can deconvolve all captured images I with the same PSF, without segmenting the moving objects in the image, and without estimating their velocity or depth. The small spatial shift of the PSF leads to a small spatial shift of the deconvolved image, but such a shift is uncritical as it does not translate to visual artifacts. This simply means that the position of moving objects corresponds to different time instants within the exposure. The time shift for a given velocity corresponds to the time where the sensor is perfectly tracking this velocity.

It is noted that the above invariance involves two approximations. The first approximation has to do with the fact that the invariant convolution model is wrong at the motion layer boundaries. However, this has not been a major practical issue in applicants' experiments and is visible only when both foreground and background have high-contrast textures. The second approximation results from the fact that a parabola is perfectly shear invariant only if an infinite integration time is used. For any finite time interval, the accurate projection is equal to:

$$\phi_s(x) = \qquad (6)$$

$$\begin{cases} \dfrac{1}{\sqrt{a_0\left(x + \frac{s^2}{4a_0}\right)}} & \text{for } 0 \le x + \frac{s^2}{4a_0} \le a_0\left(T - \frac{s}{2a_0}\right)^2 \\ \dfrac{1}{2\sqrt{a_0\left(x + \frac{s^2}{4a_0}\right)}} & \text{for } a_0\left(T - \frac{s}{2a_0}\right)^2 \le x + \frac{s^2}{4a_0} \le a_0\left(T + \frac{s}{2a_0}\right)^2 \\ 0 & \text{otherwise} \end{cases}$$

Thus, for a finite integration interval, the tails of the PSF do depend on the slope s. This change in the tail clipping can also be observed in the projected PSFs 28 in FIG. 2k. For a sufficiently bounded range of slopes the tail clipping happens far enough from the center and its effect could be neglected. However, Equation 6 also highlights the tradeoffs in the exact parabola scaling $a_0$. Smaller $a_0$ values lead to a sharper PSF. On the other hand, for a given integration interval [−T, T], the tail clipping starts at $$\sqrt{a}\left(T - \frac{s}{2a_0}\right);$$

thus reducing $a_0$ also reduces the range of s values for which the tail clipping is actually negligible.

Figure 3:
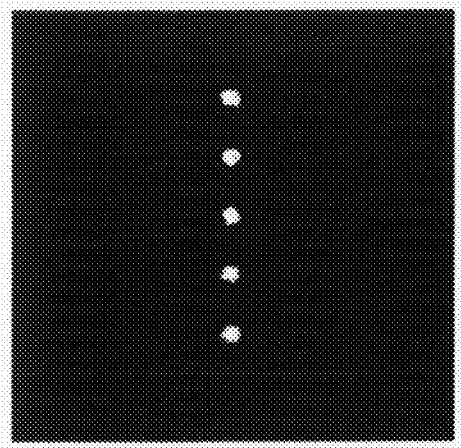
FIGS. 3a-3d is a set of simulated photographs of five dots moving over a range of speeds and directions.
Figure 3:
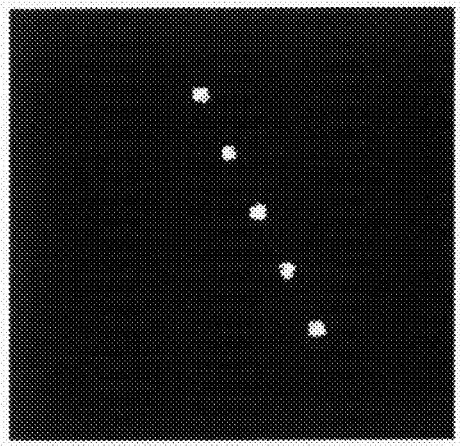
Figure 3:
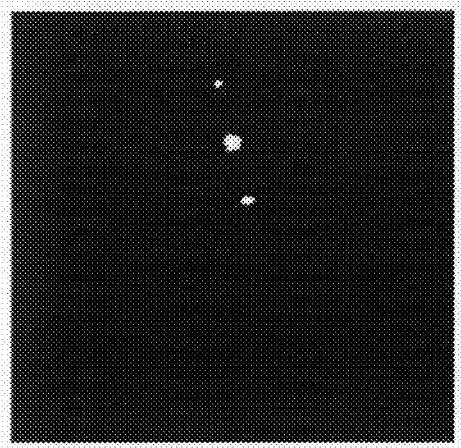
Figure 3:
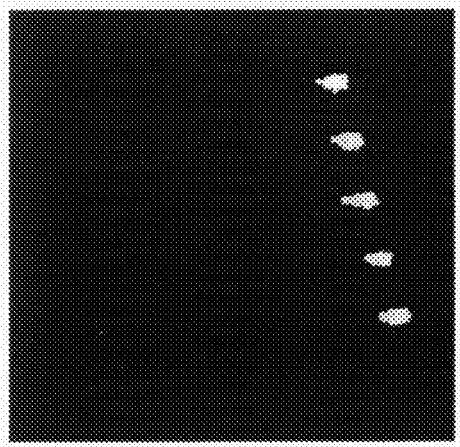

Simulation: To simulate the blur from a camera moving in a parabolic displacement in space-time (constant 1D acceleration), applicants projected synthetic scenes and summed displaced images over the camera integration time. FIG. 3a shows five dots at the initial time, with their motion vectors, and FIG. 3b shows their final configuration at the end of the camera integration period. FIG. 3c is the photograph obtained with a static camera, revealing the different impulse responses for each of the five different dot speeds. FIG. 3d shows the image that would be recorded from the camera undergoing a parabolic displacement. Note that now each of the dots creates virtually the same impulse response, regardless of its speed of translation (there is a small speed-dependent spatial offset to each kernel). This allows an unblurred image to be recovered from spatially invariant deconvolution.

Optimality

Applicants derive optimality criteria as follows.

Upper Bound

We have seen that the parabola is a shear invariant curve, and that parabolic displacement is one camera movement that yields a PSF invariant to motion. Here applicants show that, in the case of 1D motions, this curve approaches optimality even if we drop the motion-invariant requirement. That is, suppose that we could perfectly segment the image into different motions, and accurately know the PSF of each segment. For good image restoration, we want the PSFs corresponding to different velocities or slopes to be as easy to invert as possible. In the Fourier domain, this means that low Fourier coefficients must be avoided. We show that, for a given range of velocities, the ability to maximize the Fourier spectrum is bounded and that our parabolic integration approaches the optimal spectrum bound.

At a high level, our proof is a bandwidth budget argument. We show that, for a given spatial frequency $w_x$, we have a fixed budget which must be shared by all motion slopes. A static camera spends most of this budget on static objects and therefore does poorly for other object speeds. In contrast, our approach attempts to distribute this budget uniformly across the range of velocities and makes sure that no coefficient is low.

Space time integration in the frequency domain: We consider the Fourier domain $\omega_x$, $\omega_t$ of a scanline of space time. Fourier transforms will be denoted with a hat and Fourier pairs will be denoted $k \Leftrightarrow \hat{k}$.

First consider the space-time function of a static object. It is constant over time, which means that its Fourier transform is non-zero only on the pure spatial frequency line $\omega_t=0$. This line is the 1D Fourier transform of the ideal instantaneous image $I^0$.

We have seen that image-space object velocity corresponds to the slope of a shear in space time. In the frequency domain, a given slope corresponds to a line orthogonal to the primal slope. Or equivalently, the shear in the primal corresponds to a shear in the opposite direction in the Fourier domain. The frequency content of an object at velocity s is on the line of slope s going through the origin. A range of velocities $-S \leq s \leq S$ corresponds to a double-wedged in the Fourier domain. This is similar to the link between depth and light field spectra (Chai, J., Tong, X., Chan, S., and Shum, H., "Plenoptic sampling," *SIGGRAPH*, 2000; Isaksen, A., McMillan, L., and Gortler, S. J., "Dynamically reparameterized light fields," *SIGGRAPH*, 2000). This double-wedged is the frequency content that we strive to record. Areas of the Fourier domain outside it correspond to faster motion, and can be sacrificed.

Consider a given light integration curve f and its 2D trace k(x,t) in space time, where k(x,t) is non zero only at x=f(t) (FIGS. 4a-4d). The 1D image scanline can be seen as the combination of a 2D convolution in space time by k, and a 2D (two-dimensional) to 1D (one-dimensional) slicing. That is, we lookup the result of the convolution only at time t=0. The convolution step is key to analyzing the loss of frequency content. In the Fourier domain, the convolution by k is a multiplication by its Fourier transform $\hat{k}$.

Figure 4:
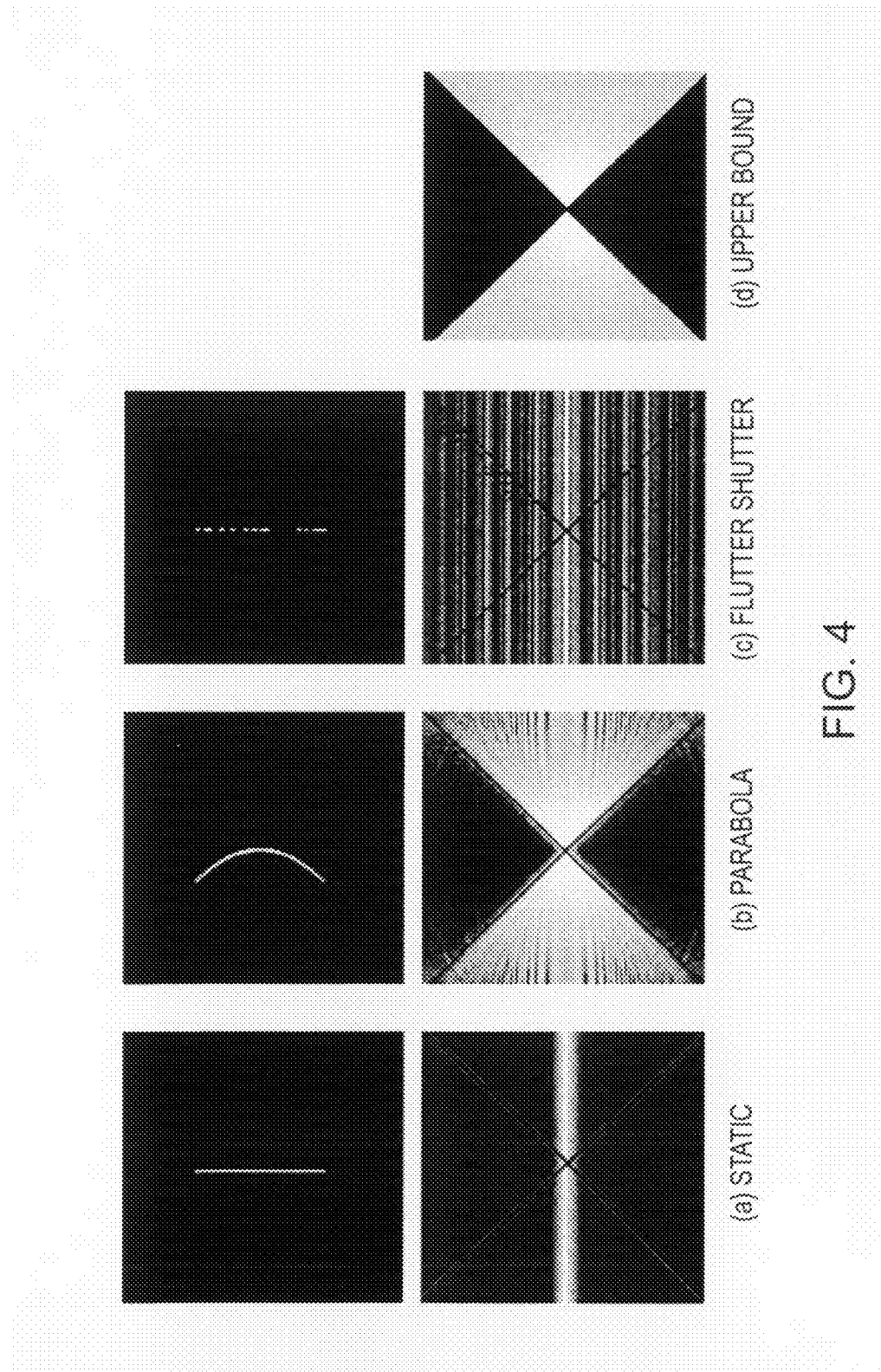
FIGS. 4a-4d are illustrations of integration curve traces in space time and corresponding log spectrums of a static camera, a parabolic motion camera of the present invention, a flutter shutter camera and the upper bound.

For example, a static camera has a kernel k that is a box in time, times a Dirac in space. Its Fourier transform is a sinc in time, times a constant in space (FIG. 4a). The convolution by k results in a reduction of the high temporal frequencies according to the sinc. Since faster motion corresponds to larger slopes, their frequency content is more severely affected, while a static object is perfectly imaged.

In summary, we have reduced the problem to designing an integration curve whose spectrum $\hat{k}$ has the highest possible Fourier coefficients in the double-wedge defined by a desired velocity range.

Slicing: We now show that for each vertical slice of the Fourier doubled wedge, we have a fixed bandwidth budget because of conservation of energy in the spatial domain. That is, the sum of the squared Fourier coefficients for a given spatial frequency $\omega_x$ is bounded from above.

When studying slices in the Fourier domain, we can use the slicing theorem. First consider the vertical Fourier slice $\hat{k}_0$ going through (0,0). In the primal space time, this Fourier slice corresponds to the projection along the horizontal x direction.

$$\hat{k}_0(\omega_t) \Leftrightarrow k_p(t) = \int_x k(x,t) dx$$

And using the shifting property, we obtain an arbitrary slice for a given $\omega_x$ using $$\hat{k}_{\omega_x}(\omega_t) \Leftrightarrow \int_x k(x,t) e^{-2\pi i \omega_x x} dx$$

which only introduces phases shifts in the integral.

Conservation of energy: We have related slices in the Fourier domain to space-only integrals of our camera's light integration curve in space-time. In particular, the central slice is the Fourier transform of $k_p(t)$, the total amount of light recorded by the sensor at a given moment during the exposure. Conservation of energy imposes $$k_p(t) \leq 1 \qquad (8)$$

Since k is non-zero only during the 2T exposure time, we get a bound on the square integral $$\int k_p(t)^2 dt \leq 2T \qquad (9)$$

This bound is not affected by the phase shift used to extract slices at different $\omega_x$.

Furthermore, by Parseval's theorem, the square integral is the same in the dual and the primal domains. This means that for each slice at a spatial frequency $\omega_x$, $$\int_{\omega_t} \hat{k}_{\omega_x}(\omega_t)^2 d\omega_t = \int_t [k_p(t) e^{-2\pi \omega_x x}]^2 dt \qquad (10)$$

$$\leq 2T \qquad (11)$$

The squared integral for a slice is bounded by a fixed budget of 2T. In order to maximize the minimal frequency response, one should use a constant magnitude. Given the wedged shape of our velocity range in the Fourier domain, we get $$\min_{\omega_t} |\hat{k}_{\omega_x}(\omega_t)|^2 \leq \frac{T}{S|\omega_x|} \qquad (12)$$

where S is the absolute maximal slope (speed). This upper bound is visualized in FIG. 4d. In other words, if we wish to maximize the spectrum of the PSFs over a finite slope range $-S \leq s \leq S$, Eq 12 provides an upper bound on how much we can hope to achieve.

When one wants to cover a broader range of velocities, the budget must be split between a larger area of the Fourier domain and overall signal-noise ratio is reduced according to a square root law.

Discussion of Different Cameras

Applicants have shown that in a traditional static camera, the light integration curve in space-time k(x,t) is a vertical box function. Performances are perfect for the $\omega_t=0$ line corresponding to static objects, but degrade according to a sinc for lines of increasing slope, corresponding to higher velocities.

The flutter-shutter approach adds a broad-band amplitude pattern to a static camera. The integration kernel k is a vertical 1D function over [−T,T] and the amount of recorded light is halved. Because of the loss of light, the vertical budget is reduced from 2T to T for each $\omega_x$. Furthermore, since k is vertical, its Fourier transform is constant along $\omega_x$. This means that the optimal flutter code must have constant spectrum magnitude over the full domain of interest (FIG. 4c). This is why the spatial resolution of the camera must be taken into account. The intersection of the spatial bandwidth $\Omega_{max}$ of the camera and the range of velocities defines a finite double-wedge in the Fourier domain. The minimum magnitude of the slice at $\Omega_x$ is bounded by $$\frac{T}{2S\Omega_x}.$$

Since $\hat{k}$ is constant along $\omega_x$, this bound applies to all $\omega_x$. As a result, for all band frequencies $|\omega_x|<\Omega_{max}$, $\hat{k}$ spends energy outside the slope wedge and thus does not make a full usage of the vertical $\hat{k}\omega_x$, budget.

The parabolic integration curve attempts to distribute the bandwidth budget equally for each $\omega_x$ slice (FIG. 4b), resulting in almost the same performance for each motion slope in the range, but a falloff proportional to $1/\sqrt{\omega_x}$ along the spatial dimension. To see why, applicants note that using some calculus manipulation the Fourier transform of an infinite parabola can be computed explicitly. If the integration kernel k is defined via the (infinite) parabola curve $f(t)=a_0t^2$, then $$\hat{k}(\omega_x, \omega_t) = \frac{1}{\sqrt{2a_0\omega_x}} e^{i\frac{\omega_t^2}{4a_0\omega_x}} \quad (13)$$

On the other hand, achieving a good PSF for all $-S \leq s \leq S$ implies that $$a_0 \geq \frac{S}{2T}$$

(otherwise, from Eq 6 the PSF won't include an infinite spike). Using Eq 13, applicants can conclude that if the exposure was infinitely long $$|\hat{k}(\omega_x, \omega_t)|^2 = \frac{T}{S|\omega_x|}$$

and the infinite parabola has the same falloff as the upper bound. Of course, the upper bound is valid for a finite exposure, and we can relate the infinite parabola to our finite kernel by a multiplication by a box in the spatial domain, which is a convolution by a sinc in the Fourier domain. Thus, the parabola curve of finite exposures approaches the upper bound, in the limit of long exposure times. The intuitive reason why the parabolic camera can better adapt to the wedged shape of the Fourier region of interest is that its kernel is not purely vertical, that is, the sensor is moving. A parabola in 2D contains edge pieces of different slopes, which corresponds to Fourier components of orthogonal orientation.

In summary, in the special case of 1D motions, if one seeks the ability to reconstruct a given range of image-space velocities, with minimal degradation to the reconstructed image for any velocity, the parabolic light integration curve is near optimal. On the other hand, a fluttered shutter can handle all motion directions, albeit at the cost of motion identification and image segmentation.

Figure 5:
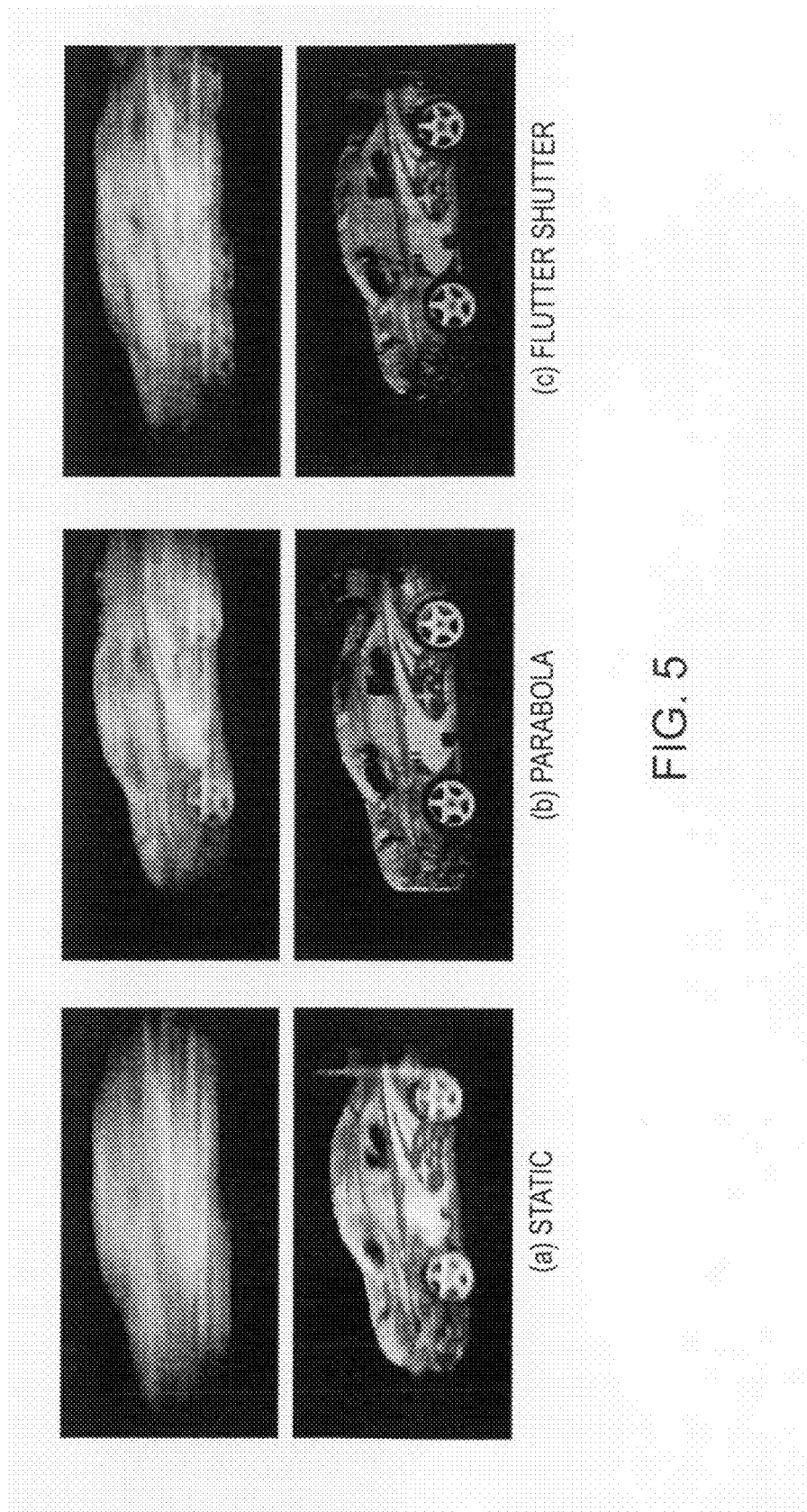
FIGS. 5a-5c are synthetic visualizations (imagery) of point spread function information loss between a blurred input and deblurring solution result.

Simulation: To visualize these tradeoffs, in FIGS. 5a-5c, applicants synthetically rendered a moving car. Applicants simulate a static camera (FIG. 5a), a parabolic displacement (FIG. 5b), and a static camera with a flutter-shutter (FIG. 5c), all with an identical exposure length and an equal noise level. The box-deblurred car in FIG. 5a lost high frequencies. The flutter-shutter reconstruction (FIG. 5c) is much better, but the best results are obtained by the parabolic blur (FIG. 5b) of the present invention.

A static camera, the flutter shutter camera, and a parabolic motion camera (the present invention) each offer different performance tradeoffs. A static camera is optimal for photographing static objects, but suffers significantly in its ability to reconstruct spatial details of moving objects. A flutter shutter camera is also excellent for photographing static objects (although records a factor of two less light than a full exposure). It provides good spatial frequency bandwidth for recording moving objects and can handle 2D motion. However, to reconstruct, one needs to identify the image velocities and segment regions of uniform motion. Motion-invariant photography of the present invention (e.g., parabolic motion camera) requires no speed estimation or object segmentation and provides nearly optimal reconstruction for the worst-case speed within a given range. However, relative to the static camera and the flutter shutter camera, it gives degraded reconstruction of static objects. While the invention method is primarily designed for 1D motions, we found it gave reasonable reconstructions of some 2D motions as well.

Figure 1B:
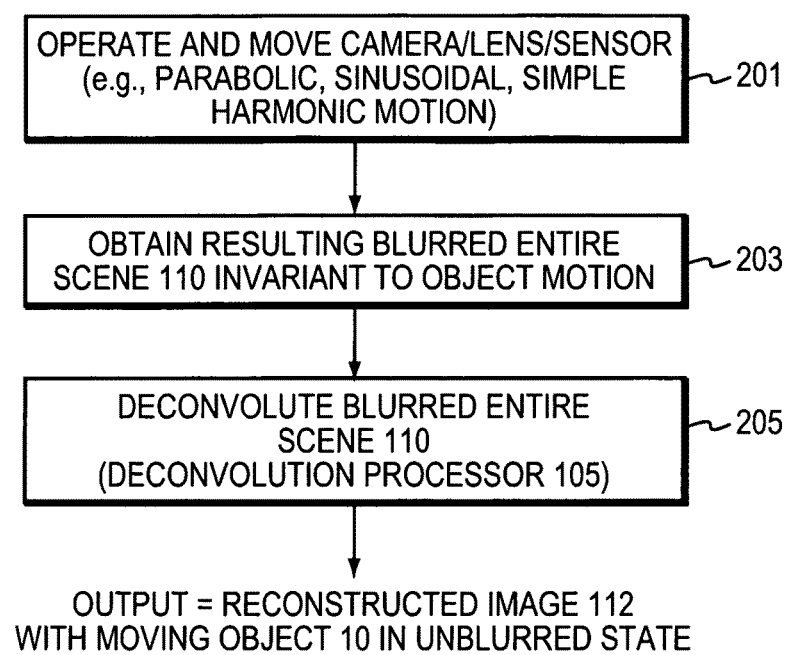
FIG. 1b is a flow diagram of an embodiment of the present invention.
Figure 7:
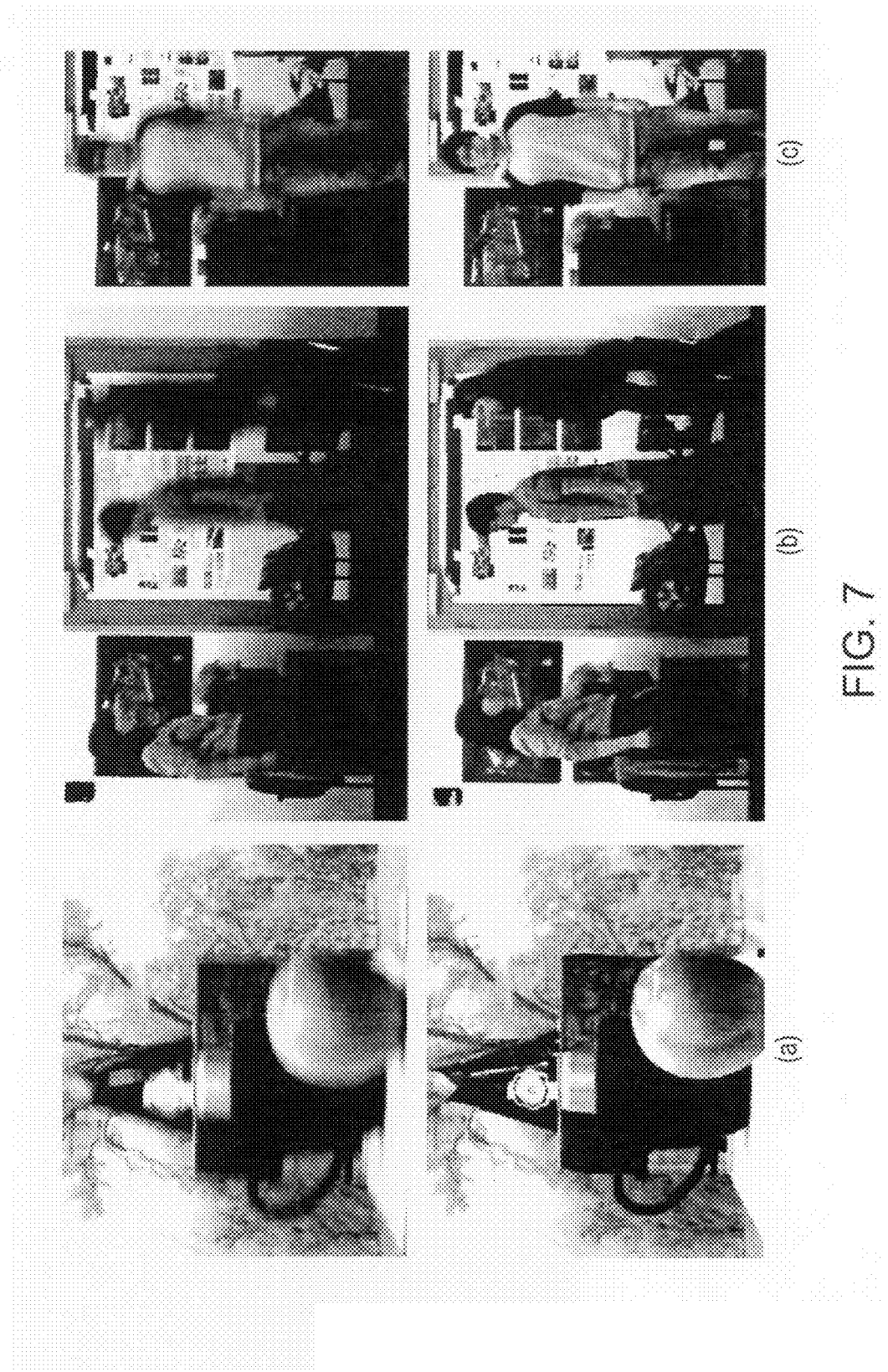
FIGS. 7a-7c are photographic illustrations of deblurring results of the present invention.

Embodiments of the present invention 11 are thus as illustrated in FIGS. 1a and 1b. With reference to FIG. 1a, a camera system 103 includes an automated control assembly 101 (such as that in FIG. 7 or similar) and a camera 100. The camera 100 has (i) a lens and/or lens elements for focusing and defining the field of view 125 and (ii) an optional motion sensor. The automated control assembly 101 has a motor and/or electro-mechanical mechanism for moving the camera 100, lens, lens element(s) or sensor as prescribed by the present invention.

In particular, the automated control assembly 101 operates the camera 100 to produce a subject image having both moving objects 10 and static objects 20. First as shown at step 201 in FIG. 1b, the control assembly 101 operates the camera shutter together with moving the camera 100 (as a whole, or just the lens or sensor) preferably in a lateral parabolic motion. Other linear movement such as in a sinusoidal pattern or simple harmonic motion or the like are suitable. The result is an entire scene blurred 110 with a single point spread function (PSF) throughout. As obtained at step 203, the blurred entire scene (i.e., working or intermediate image) 110 is invariant to object motion of the moving objects 10. Thus, a deconvolution processor 105 reconstructs the subject image with one PSF and without requiring a velocity or depth of the moving object 10. Step 205 is illustrative.

The deconvolution processor 105 may be within the camera 100 processing during image exposure (near real time) or external to the camera 100 processing subsequence to image exposure. Deconvolution processor (or similar engine) 105 employs deconvolution algorithms and techniques known in the art. Example deconvolution techniques are as given in Levin, A., Fergus, R., Durand, F., and Freeman, W., "Image and depth from a conventional camera with a coded aperture," *SIGGRAPH*, 2007; and Lucy, L., "Bayesian-based iterative method of image restoration," *Journal of Ast.*, 1974, both herein incorporated by reference.

The reconstructed image 112 showing moving objects 10 and static objects 20 in an unblurred state is produced (generated as output).

Experiments

Figure 6:
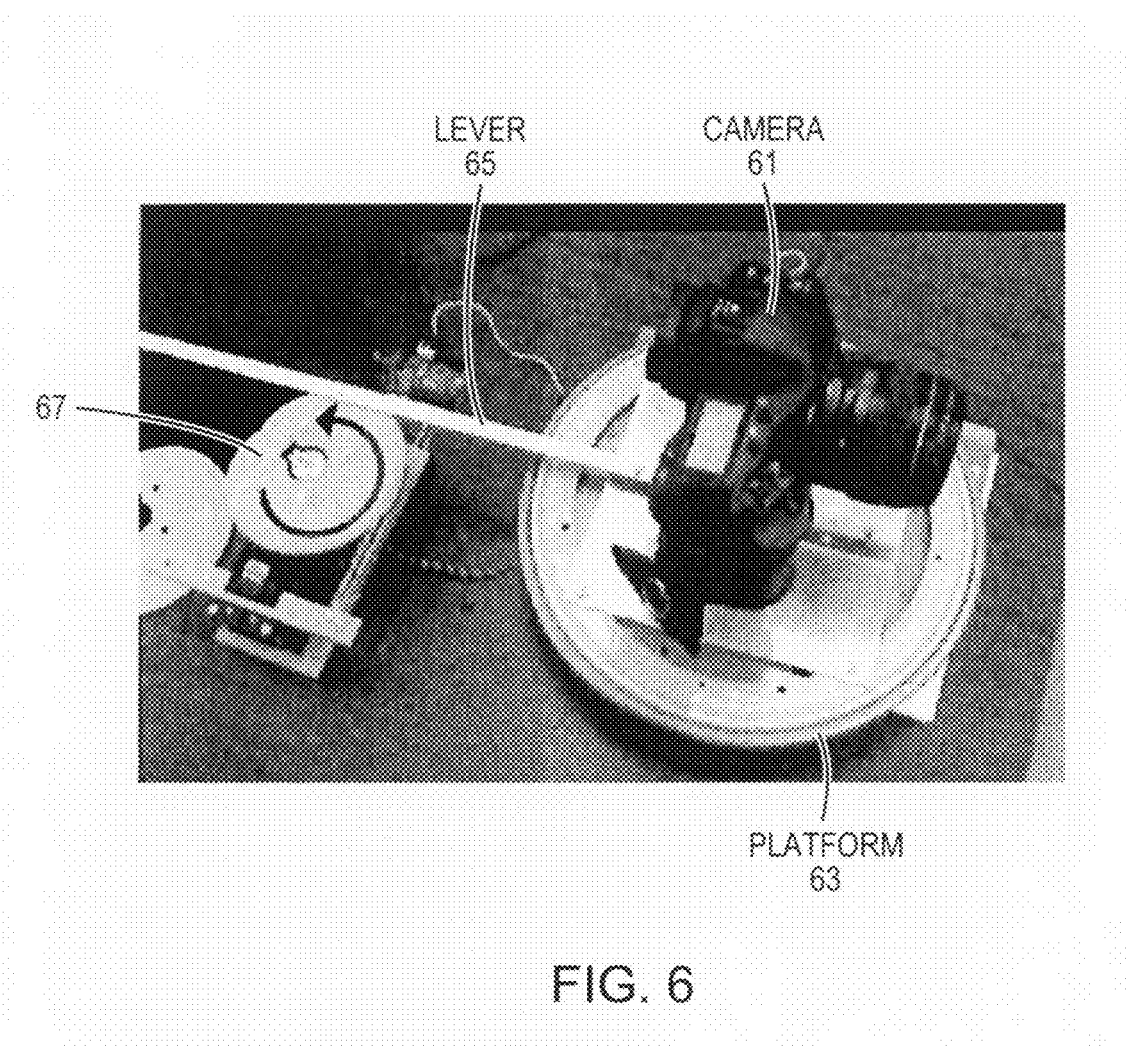
FIG. 6 is a schematic view of one embodiment of the present invention.

While camera stabilization hardware should be capable of moving a detector with the desired constant acceleration (parabolic displacement) inside a hand-held camera, applicants chose to use larger scale structures for an initial prototype, and approximate sensor translation using a rotation of the entire camera. The hardware shown in FIG. 6 rotates the camera 61 in a controlled fashion to evaluate the potential of motion-invariant photography. The camera (for instance a Canon EOS 1D Mark II with an 85 mm lens) sits on a platform 63 that rotates about a vertical axis through the camera's optical center. Applicants use a cam approach to precisely control the rotation angle over time. A rotating cam 67 moves a lever 65 that is rigidly attached to the camera 61 to generate the desired acceleration. For $\theta \in [-\pi,\pi]$ the cam 67 edge is designed such that the polar coordinate radius is a parabola:

$$x(\theta)=\cos(\theta)(c-b\theta^2)$$

$$y(\theta)=\sin(\theta)(c-b\theta^2) \quad (14)$$

In applicants' experiments, c=8 cm, b=0.33 cm. The cam 67 rotates at a constant velocity, pushing the lever arm 65 to rotate the camera 61 with approximately constant angular acceleration, yielding horizontal motion with the desired parabolic integration path in space-time. For a fixed cam size, one can increase the magnitude of the parabola by moving the cam 67 closer to the camera 61. Applicants place a static camera next to the rotating camera 61 to obtain a reference image for each moving-camera image. A microcontroller synchronizes the cam 67 rotation and the camera shutters. In order to reduce mechanical noise, the exposure length of the system was set to 1 second. This relatively long exposure time limits the linear motion approximation for some real-world motions. To calibrate the exact PSF produced by the rotating camera 61, applicants captured a blurred image I of a calibration pattern. Applicants also captured a static image $I_0$ of the same pattern and solved for the PSF $\phi$ minimizing the squared convolution error: $\phi=\text{argmin }\|I^0-\phi*I\|^2$.

Results

The deconvolution results presented herein were achieved with the sparse deconvolution algorithm of Levin, A., Fergus, R., Durand, F., and Freeman, W., "Image and depth from a conventional camera with a coded aperture," *SIGGRAPH*, 2007 (incorporated herein by reference). Comparable, but slightly worse, results can be obtained using the Richardson-Lucy deconvolution algorithm (see Lucy, L., 1974, cited above).

FIGS. 7a-c present deblurring results on images captured by the invention camera 100, 61. For each example, FIGS. 7a, 7b, 7c present the scene (top row) captured by a synchronized static camera and the deconvolution results (bottom row) obtained from the invention moving camera 100, 61. In the first pair of images (FIG. 7a), the moving objects were mounted on a linear rail to create multiple velocities from the multiple depth layers. The other pairs of images (FIGS. 7b, 7c) involved natural human motions. The invention approach (bottom row FIGS. 7a-7c) deblurs the images reasonably well despite the fact that the human motions were neither perfectly linear nor horizontal. The middle pair of images (FIG. 7b) shows multiple independent motions in opposite directions, all deblurred well in the present invention (bottom FIG. 7b). The far-right image pair (FIG. 7c) had many non-horizontal motions, resulting from the man (moving subject) walking toward the camera. While the face contains some residual blur, the deconvolved image has few objectionable artifacts.

Applicants are encouraged by the deconvolution results on some images even with substantial non-horizontal motions. One possible explanation for the results is the aperture effect, the ambiguity of the 2D motion of locally 1-dimensional image structures, such as edges and contours. The velocity component normal to the edge or contour is determined from the image data, but the parallel component is ambiguous. Local image motion that could be explained by horizontal motions within the range of the camera motions should deconvolve correctly, even though the object motions were not horizontal.

Note that the static object resolution in applicants results decreases with respect to the static camera input, as applicant uniformly distribute the bandwidth budget over velocities range.

Figure 8:
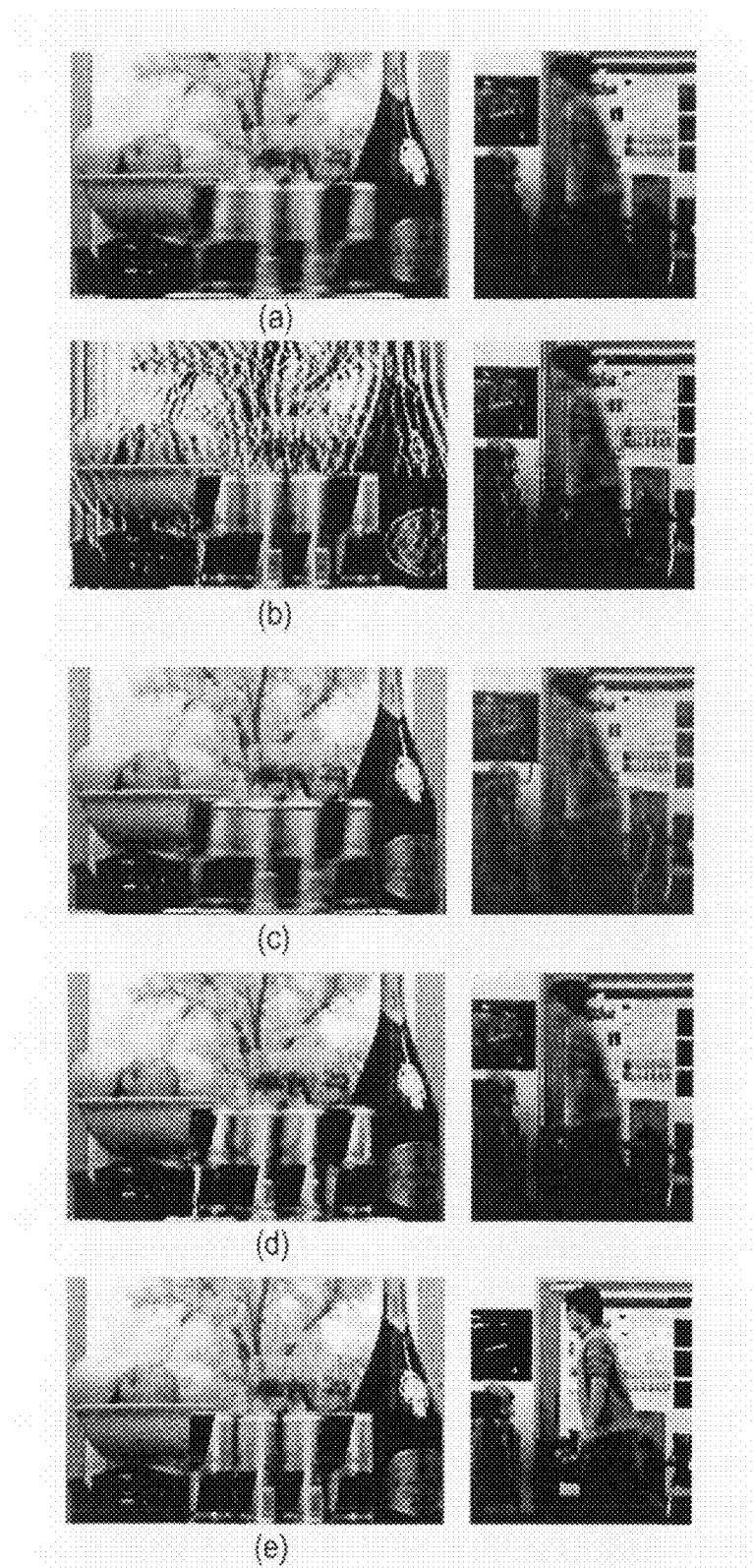
FIGS. 8a-8e are comparisons of deblurring photographic images using the present invention and using static camera deblurring of the art.

Motion deblurring from a stationary camera is very challenging due to the need to segment the image by motion and estimate accurate PSFs within each segment. FIGS. 8a-8e demonstrate these challenges. For example, we can try to deconvolve the image with a range of box widths, and manually pick the one producing the most visually plausible results (FIG. 8b). In the first row of images (FIG. 8a), static camera images are presented. Here deconvolving with the correct blur can sharpen the moving layer, but creates significant artifacts in the static parts, and an additional segmentation stage is required. In the second case, images of FIG. 8b show a box filter filtered manually to the moving layer and applied to deblur the entire image. As a result, most blurred edges are occlusion boundaries and even manually identifying the correct blur kernel is challenging. In FIG. 8c-8d, results of a recent automatic algorithm (Levin 2006, cited above) are shown. The images of FIG. 8c employed layers segmentation by Levin 2006, and the images of FIG. 8d show deblurring results of Levin 2006. While this algorithm did a reasonable job for the left-hand side image (which was captured using a linear rail) it did a much worse job on the human motion in the right-hand side image.

The present invention results obtained spatially uniform deconvolution of images (FIG. 8e) from parabolic integration.

Figure 9:
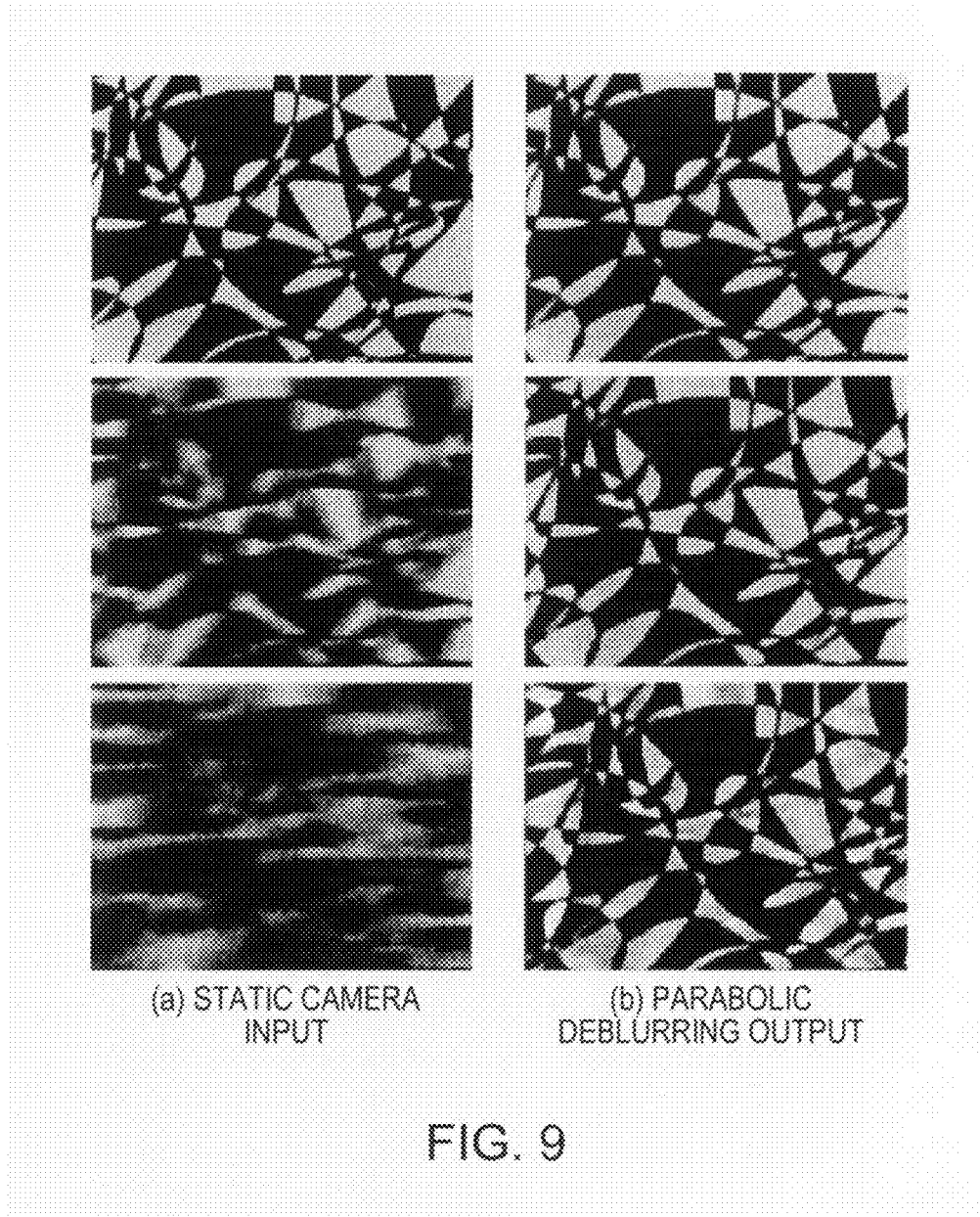
FIGS. 9a-9b are scene views illustrating the present invention PSF clipping and a working velocities range.

In FIG. 9, applicants illustrate the effect of the PSF tail clipping (discussed above in FIG. 2k and Eq 6) on the valid velocities range. Applicants used the invention parabolic camera to capture a binary pattern. The pattern was static in the first shot (top row FIGS. 9a-9b) and for the other two (middle and bottom rows FIGS. 9a-9b) linearly moving during the exposure. As shown in the top image of FIG. 9b, the static motion was easily deblurred, and the PSF approximation is reasonable for the slow motion case as well. For the faster motion case (middle and bottom images FIG. 9b), deconvolution artifacts start to be observed, as effect of the clipping of the tails of the PSF becomes important and the static motion PSF is not an accurate approximation for the moving object smear.

Accordingly, the present invention suggests a solution that handles motion blur along a 1D direction. In the invention system 11, the camera 100 (FIGS. 1*a*, 1*b*) translates within its exposure following a parabolic displacement rule. The blur resulting from this special camera motion is shown to be invariant to object (moving and/or static) depth and velocity. Hence, blur can be removed by deconvolving the entire image with an identical, known PSF. This solution eliminates the major traditional challenges involved with motion debluring: the need to segment motion layers and estimate a precise PSF in each of them. Furthermore, the present invention analyzes the amount of information that can be maintained by different camera paths, and show that the parabola path approaches the optimal PSF whose inversion is stable at all velocities.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

For example, the above description mentions parabolic or other motion of the camera. This motion may be manually produced by the user (photographer) in some embodiments and mechanically automated, such as by a controller assembly 101, in other embodiments.

Further, the controller 101 and deconvolution processor 105 may be executed by one CPU (digital processing unit) or chip in camera 100 or may be separate computers/digital processing systems, either stand alone or networked. Common computer network communications, configurations, protocols, busses, interfaces, couplings (wireless, etc.) and the like are used. The network may be a wide area network, a local area network, a global computer network (e.g., Internet) and the like.

Fields of application may then include:
  (a) medical imaging at hospitals, clinics, care profession's office (e.g., dentist, pediatrician, etc.), mobile unit, etc;
  (b) aerial imaging of vehicles or vessels in various terrain maneuvers;
  (c) monitoring systems at airports, secured areas, security locations, or public/pedestrian throughways; and
  (d) toll booth imagery of traveling vehicle license plates or similar check points where a moving subject is photographed for identity verification or similar purposes.

Other applications and uses are within the purview of one skilled in the art given this disclosure.

What is claimed is:

1. A method for deblurring images of a moving object, comprising: during imaging of a moving object, the moving object causing blur in an image, blurring an entire scene that includes the moving object, said blurring being invariant to the velocity of the moving object; deconvolving the blurred entire scene with a point spread function that is invariant to the velocity of the moving object to generate a reconstructed image, the reconstructed image bearing the moving object in a deblurred state, wherein the step of blurring the entire scene is in a manner enabling integration in a space and time volume that results in the point spread function being invariant to velocity of the moving object; wherein the step of blurring blurs the entire scene, including static objects and the moving object, and wherein the step of deconvolving removes blur from the blurred entire scene using the point spread function, without segmenting the moving object and without estimating velocity of the moving object.

2. A method as claimed in claim 1 wherein the step of blurring the entire scene is implemented by moving any one or combination of a camera, a lens element of the camera, and a sensor of the camera.

3. A method as claimed in claim 2 wherein the step of moving includes movement in a range of direction and speed sufficient to include direction and speed of the moving object.

4. A method as claimed in claim 3 wherein movement is any of:
  a sinusoidal pattern,
  a parabolic pattern,
  a simple harmonic motion, and
  a sweep motion starting in one direction and progressively decelerating then accelerating in an opposite direction.

5. A method as claimed in claim 4 wherein the movement follows a parabolic path by moving laterally initially at a maximum speed of the range and slowing to a stop and then moving in an opposite direction laterally, increasing in speed to a maximum speed of the range in the opposite direction and stopping.

6. A method as claimed in claim 1 wherein the moving object is a moving vehicle on a roadway.

7. A method as claimed in claim 1 wherein the moving object is a part of a mammalian body.

8. A method as claimed in claim 1 wherein the deconvolution is computed near real-time of image exposure.

9. A method as claimed in claim 1 wherein the deconvolution is by an application separate from and subsequent to image exposure by a camera.

10. A method as claimed in claim 1 wherein the reconstructed image bears multiple moving objects, each in a deblurred state.

11. An apparatus for deblurring images of a moving object, comprising: a camera controller, during imaging of a moving object, the moving object causing blur in images, the controller effectively moving a camera to blur an entire scene that includes the moving object and said blurring of the entire scene being in a manner that is invariant to the velocity of the moving object; and a deconvolution processor coupled to receive the blurred entire scene and deconvolving the blurred entire scene with a point spread function that is invariant to the velocity of the moving object, resulting in a reconstructed image bearing the moving object in a deblurred state, wherein the camera controlled blurring the entire scene is in a manner enabling integration in a space and time volume that results in the point spread function being invariant to velocity of the moving object; wherein the step of blurring blurs the entire scene, including static objects and the moving object, and wherein the step of deconvolving removes blur from the blurred entire scene using the point spread function, without segmenting the moving object and without estimating velocity of the moving object.

12. Apparatus as claimed in claim 11 where the controller effectively moving the camera moves any one or combination of the camera, a lens element of the camera and a sensor of the camera.

13. Apparatus as claimed in claim 11 wherein the controller effectively moving the camera includes movement in a range of direction and speed sufficient to include direction and speed of the moving object.

14. Apparatus as claimed in claim 13 wherein movement is any of:
  a sinusoidal pattern,
  a parabolic pattern, a simple harmonic motion, and
a sweep motion starting in one direction and progressively decelerating then accelerating in an opposite direction.

15. Apparatus as claimed in claim 14 wherein the movement follows a parabolic path by moving laterally initially at a maximum speed of the range and slowing to a stop and then moving in an opposite direction laterally, increasing in speed to a maximum speed of the range in the opposite direction and stopping.

16. Apparatus as claimed in claim 11 wherein the moving object is any of a moving vehicle on a roadway, a body part of a patient, and a face of a subject.

17. Apparatus as claimed in claim 11 wherein the deconvolution processor deconvolutes the blurred entire scene near real-time of image exposure.

18. Apparatus as claimed in claim 11 wherein the deconvolution processor executes as an application separate from and subsequent to image exposure by the camera.

19. Apparatus as claimed in claim 11 wherein the reconstructed image bears multiple moving objects, each in a deblurred state.

20. A motion invariant imaging system, the system imaging moving comprising: controller means for effectively (i) controlling a camera during imaging of a moving object, the moving object causing blur in an image, and (ii) blurring an entire scene that includes the moving object; and deconvolution means for deconvolving the blurred entire scene with a point spread function that is invariant to the velocity of the moving object to generate a reconstructed image bearing the moving object in a deblurred state; wherein blurring the entire scene includes blurring static objects and the moving object using the point spread function such that the deconvolving removes blur from the blurred entire scene using the point spread function, without segmenting the moving object and without estimating velocity of the moving object, and wherein the controller means blurring the entire scene is in a manner enabling integration in a space and time volume that results in the point spread function being invariant to velocity of the moving object; wherein the step of blurring blurs the entire scene, including static objects and the moving object, and wherein the step of deconvolving removes blur from the blurred entire scene using the point spread function, without segmenting the moving object and without estimating velocity of the moving object.

* * * * *

UNITED STATES PATENT AND TRADEMARK OFFICE
CERTIFICATE OF CORRECTION

PATENT NO. : 8,451,338 B2
APPLICATION NO. : 12/058105
DATED : May 28, 2013
INVENTOR(S) : Anat Levin et al.

It is certified that error appears in the above-identified patent and that said Letters Patent is hereby corrected as shown below:

In the Claims:

In Column 15, line 23, Claim 20: insert --objects-- before the word "comprising".

Signed and Sealed this
Sixteenth Day of July, 2013

Teresa Stanek Rea
*Acting Director of the United States Patent and Trademark Office*